US008301829B2

(12) United States Patent
Lee

(10) Patent No.: US 8,301,829 B2
(45) Date of Patent: Oct. 30, 2012

(54) FLASH MEMORY DEVICE AND FLASH MEMORY SYSTEM INCLUDING BUFFER MEMORY

(75) Inventor: Jin-Yub Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/108,687

(22) Filed: May 16, 2011

(65) Prior Publication Data

US 2011/0219179 A1    Sep. 8, 2011

Related U.S. Application Data

(63) Continuation of application No. 10/957,302, filed on Sep. 30, 2004, now abandoned.

(30) Foreign Application Priority Data

Dec. 15, 2003    (KR) .................................. 2003-91307

(51) Int. Cl.
*G06F 12/02*    (2006.01)

(52) U.S. Cl. ........................................................ 711/103

(58) Field of Classification Search .................... 711/103
See application file for complete search history.

(56) References Cited

U.S. PATENT DOCUMENTS

| 5,748,553 | A | 5/1998 | Kitamura |
| 5,822,245 | A | 10/1998 | Gupta et al. |
| 5,936,971 | A | 8/1999 | Harari et al. |
| 5,999,451 | A | * 12/1999 | Lin et al. ................. 365/185.11 |
| 6,418,506 | B1 | 7/2002 | Pashley et al. |
| 6,697,287 | B2 | * 2/2004 | Furukawa ................ 365/189.05 |
| 6,704,835 | B1 | 3/2004 | Garner |
| 2003/0137874 | A1 | * 7/2003 | Furukawa ................ 365/185.17 |
| 2004/0177212 | A1 | * 9/2004 | Chang et al. .................. 711/103 |
| 2005/0021905 | A1 | * 1/2005 | Kwon .......................... 711/103 |
| 2005/0055495 | A1 | * 3/2005 | Vihmalo et al. .............. 711/103 |

FOREIGN PATENT DOCUMENTS

| JP | 07-302176 | 11/1995 |
| JP | 2001-243171 | 9/2001 |
| JP | 2002-208288 | 7/2002 |
| JP | 2002-288034 | 10/2002 |
| JP | 2003-233529 | 8/2003 |
| KR | 2002-0094921 | 12/2002 |
| KR | 2003-0004419 | 1/2003 |

OTHER PUBLICATIONS

Thompson, L. PHY107 Partity. Archive.org date Oct. 31, 2003. http://www.shef.ac.uk/physics/teaching/phy107/parity.html.
Samsung Electronics. Application Note for NAND Flash. Apr. 1998. Samsung Electronics.

* cited by examiner

*Primary Examiner* — Yaima Campos
*Assistant Examiner* — Samuel Dillon
(74) *Attorney, Agent, or Firm* — Myers Bigel Sibley & Sajovec, P.A.

(57) ABSTRACT

A flash memory device includes a flash memory and a buffer memory. The flash memory is divided into a main region and a spare region. The buffer memory is a random access memory and has the same structure as the flash memory. In addition, the flash memory device further includes control means for mapping an address of the flash memory applied from a host so as to divide a structure of the buffer memory into a main region and a spare region and for controlling the flash memory and the buffer memory to store data of the buffer memory in the flash memory or to store data of the flash memory in the buffer memory.

18 Claims, 3 Drawing Sheets

Fig. 2

| Register Address | Meaning |
|---|---|
| F000h | Device ID Register |
| F001h | Flash Page Address Register |
| F002h | Buffer Address Register |
| F003h | Command Register |

Fig. 3

| Register Value | Command Meaning |
|---|---|
| 0000h | Flash Read Command |
| 0001h | Flash Write Command |
| 0002h | Flash Erase Command |
| 0003h | Flash Reset Command |

| Buffer Address Allocated in Host | |
|---|---|
| 0000~00FF | Main Data (1st page) |
| 0100~01FF | Main Data (2nd page) |
| 0200~02FF | Main Data (3rd page) |
| 0300~03FF | Main Data (4th page) |
| 0400~04FF | Main Data (5th page) |
| 0500~05FF | Main Data (6th page) |
| 0600~7FFF | Reserved Region |
| 8000~8007 | Spare Data (1st page) |
| 8008~800F | Spare Data (2nd page) |
| 8010~8017 | Spare Data (3rd page) |
| 8018~801F | Spare Data (4th page) |
| 8020~8027 | Spare Data (5th page) |
| 8028~802F | Spare Data (6th page) |
| 8050~EFFF | Reserved Region |
| F000~F003 | Register Region |

(b)

| Buffer Address Allocated in Memory | |
|---|---|
| 000~0FF | Main Data (1st page) |
| 100~1FF | Main Data (2nd page) |
| 200~2FF | Main Data (3rd page) |
| 300~3FF | Main Data (4th page) |
| 400~4FF | Main Data (5th page) |
| 500~5FF | Main Data (6th page) |
| 600~607 | Spare Data (1st page) |
| 608~60F | Spare Data (2nd page) |
| 610~617 | Spare Data (3rd page) |
| 618~61F | Spare Data (4th page) |
| 620~627 | Spare Data (5th page) |
| 628~62F | Spare Data (6th page) |

FLASH MEMORY DEVICE AND FLASH MEMORY SYSTEM INCLUDING BUFFER MEMORY

CLAIM OF PRIORITY

The present application is a continuation of and claims priority from U.S. patent application Ser. No. 10/957,302, filed Sep. 30, 2004 now abandoned, which claims priority under 35 U.S.C. §119 to Korean Patent Application No. 10-2003-0091307, filed on Dec. 15, 2003, the disclosures of which are hereby incorporated by reference herein in their entireties.

FIELD OF THE INVENTION

This disclosure generally relates to flash memory devices and, more specifically, to a flash memory device and a flash memory system including a buffer memory having the same structure as the flash memory.

BACKGROUND OF THE INVENTION

Flash memories are high-integration non-volatile memories. Flash memories have been used as a main memory in systems due to excellent data preservation. In addition, flash memories can be available to a DRAM (Dynamic RAM) or a SRAM (Static RAM).

Flash memories have been a main concern as alternate devices of hard and floppy disks in the memory field because of their high-integration and capacity. These flash memories are widely useful in the field of digital storage media of portable digital electronic machines such as cellular telephones, MP3 players, camcoders and personal digital assistants (PDAs), and so on.

However, these flash memories have several disadvantages in comparison with RAM. For example, they require a relatively long time to read and write data, and it is impossible to perform random access. To overcome these disadvantages, new methods of supporting random access by locating buffer memories in flash memory devices have been developed in recent years. The buffer memories are random access memories (e.g., DRAM or SRAM).

Data is not directly stored in a flash memory from a host but stored in a random access buffer memory in advance. Next, data stored in the buffer memory is stored in the flash memory. In the same way, data stored in the flash memory is not directly transmitted to the host but is stored in the buffer memory in advance. Next, data stored in the buffer memory is transmitted to the host.

In order to support random access, before data is written in the flash memory or is transmitted to the host, a buffer memory for temporarily holding data is required. Accordingly, the buffer memory is indispensable in systems for randomly accessing data employing the flash memory.

However, flash memories being non-volatile memory and buffer memories being volatile memory have different address structures, respectively. The flash memories consist of pages being a basic unit of write and read. The page is divided into a main region and a spare region. Generally, memory capacity of one page is 528 Bytes. Among 528 Bytes, the main region is 512 Bytes, and the spare region is 16 Bytes. The buffer memory is not divided into a page, nor main and spare regions. Accordingly, in order to use a buffer memory efficiently, it is essential to coordinate the buffer memory structure with the flash memory structure.

SUMMARY OF THE INVENTION

One purpose of the present invention provides a flash memory device and a flash memory system, which are capable of efficiently performing a random access by including a buffer memory having the same structure as the flash memory.

According to the present invention, the flash memory device comprises: a flash memory divided into a main region and a spare region; a buffer memory for temporarily storing data to be written in the flash memory or data to be read from the flash memory, the buffer memory being divided into a main region and a spare region so as to have the same address structure as the flash memory; and control means for mapping an address of the flash memory applied from a host to be suitable to the buffer memory, and controlling the flash memory and the buffer memory to store data of the buffer memory in the flash memory or to store data of the flash memory in the buffer memory.

In this embodiment, the flash memory, the buffer memory, and the control means are structured on one chip, respectively.

In this embodiment, a host interface for changing a control signal, an address and data, which are applied from the host into an internal signal for operating the flash memory device, is further included.

In this embodiment, the buffer memory is a random access memory.

In this embodiment, the random access memory is a SRAM or a DRAM.

In this embodiment, the control means comprises: a register for temporarily storing an address of the flash memory, an address of the buffer memory, and a command; a buffer controller for controlling read and write operations of the buffer memory; a flash controller for controlling read and write operations of the flash memory; and a state machine for controlling the buffer controller and the flash controller so as to respectively store data of the buffer memory or the flash memory in the flash memory or the buffer memory according to values stored in the register.

In this embodiment, the control means further includes an error correction and data input/output circuit. The error correction and data input/output circuit is controlled by the state machine and corrects an error of data transmitted between the buffer memory and the flash memory.

In this embodiment, the control means further includes a decoder for mapping an address applied from the buffer controller.

In this embodiment, the decoder separates an address input to the buffer memory into a main region and a spare region.

A memory system according to the present invention comprises: a host; and a flash memory device for storing data or outputting a stored data according to a request of the host. The flash memory device comprises: a flash memory divided into a main region and a spare region; a buffer memory for temporarily storing data to be written in the flash memory or data to be read from the flash memory, the buffer memory being divided into a main region and a spare region so as to have the same address structure as the flash memory; and control means for mapping an address applied from a host to be suitable to the buffer memory, and controlling the flash memory and the buffer memory to store data of the buffer memory in the flash memory, or to store data of the flash memory in the buffer memory.

In this embodiment, the flash memory, the buffer memory and the control means are structured on one chip, respectively.

In this embodiment, a host interface for changing a control signal, an address and data, which are applied from the host into an internal signal for operating the flash memory device is further included.

In this embodiment, the buffer memory is a random access memory.

In this embodiment, the random access memory is a SRAM or a DRAM.

In this embodiment, the control means comprises: a register for storing an address of the flash memory, an address of the buffer memory, and a command; a buffer controller for controlling read and write operations of the buffer memory; a flash controller for controlling read and write operations of the flash memory; and a state machine for controlling the buffer controller and the flash controller so as to respectively store data of the buffer memory or the flash memory in the flash memory or the buffer memory according to values stored in the register.

In this embodiment, the control means further includes an error correction and data input/output circuit. The error correction and data input/output circuit is controlled by the state machine and corrects an error of data transmitted between the buffer memory and the flash memory.

In this embodiment, the control means further includes a decoder for mapping an address applied from the buffer controller.

In this embodiment, the decoder separates an address input to the buffer memory into a main region and a spare region.

BRIEF DESCRIPTION OF THE DRAWINGS

FIG. 2 is a table showing an address and a meaning of a register of FIG. 1.

FIG. 3 is a table showing a value of a command register of FIG. 2 and operations according to thereof.

FIG. 4 is a table showing that an address allocated in a host maps to an address of a buffer address allocated in a memory.

DETAILED DESCRIPTION OF THE PREFERRED EMBODIMENT

Figure 1:
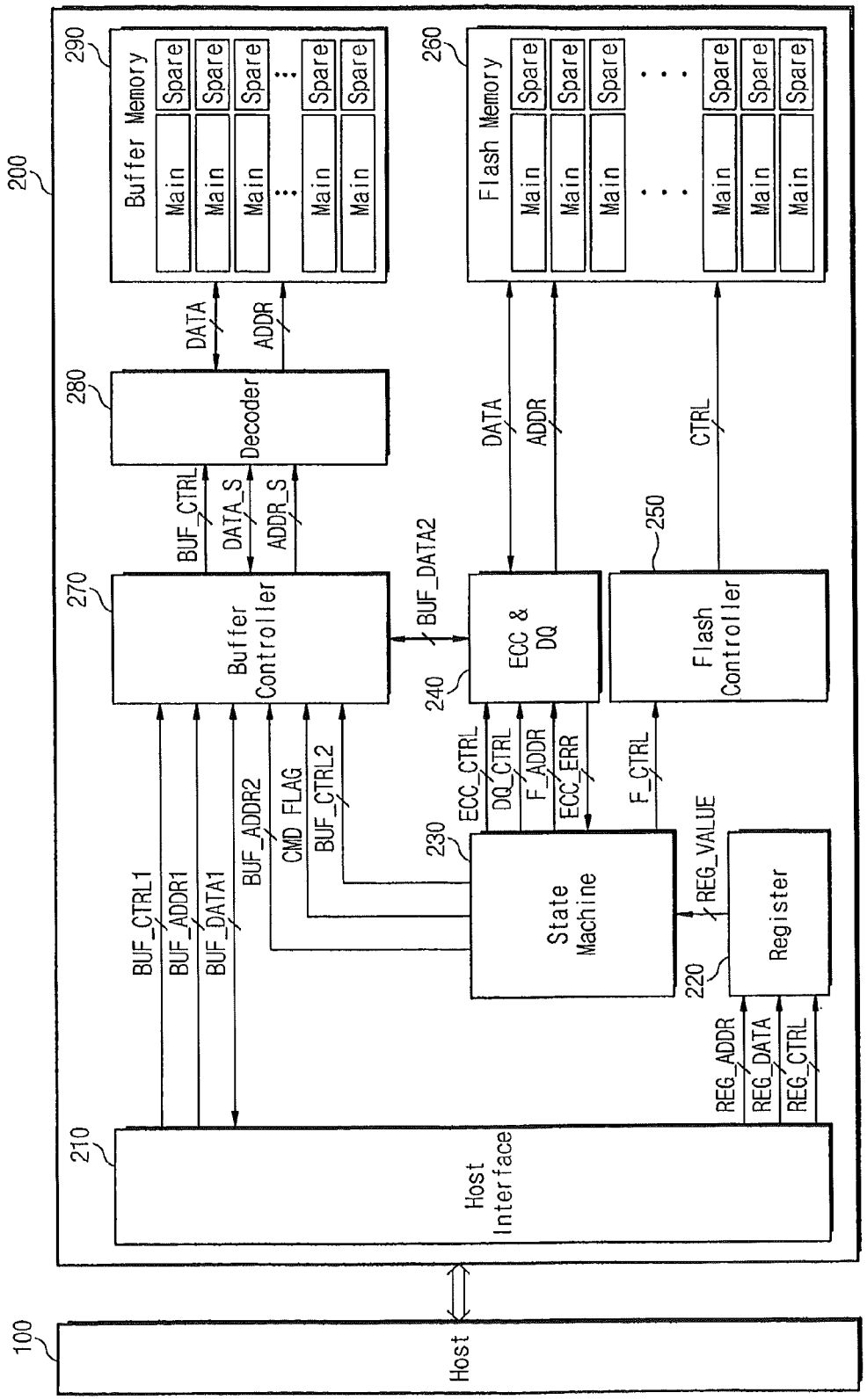
FIG. 1 is block diagram showing a flash memory device and a flash memory system according to the present invention.

The present invention will be described more fully hereinafter with reference to the accompanying drawings, in which exemplary embodiments of the invention are shown.

FIG. 1 is a block diagram of a flash memory device including a buffer memory being a random access memory. A flash memory device 200 according to the present invention is connected through a bus to a host 100. The flash memory device 200 inputs data to a flash memory 260 or outputs data stored in the flash memory 260 depending on a control of the host 100.

A host interface 210 is directly connected to the host 100. The host interface 210 receives signals input from the host 100 through the bus. Signals input from the host 100 are a control signal, an address, and data. The signals are changed into internal signals for operating the flash memory device 200. The internal signals become applied to a register 220 and a buffer controller 270, which are located in the flash memory device 200.

The host interface 210 may be embodied through various interface modes. For example, the host interface 210 may be embodied by a SRAM interface mode. Also, the host interface 210 may be embodied by a NOR flash memory interface mode similar to the SRAM interface mode.

The flash memory device 200 includes the flash memory 260 and a buffer memory 290. The host 100 transmits data to be stored in the flash memory 260 to the flash memory device 200 through the bus. The flash memory device 200 temporarily stores transmitted data in the buffer memory 290 before the transmitted data is input to the flash memory 260.

Conversely, data stored in the flash memory 260 is temporarily stored in the buffer memory 290 before it is transmitted to the host 100. Data stored in the buffer memory 290 becomes read internally. The read data is transmitted to the host 100. The flash memory device 200 becomes capable of performing a random access by data read and write operations employing the buffer memory 290.

The flash memory 260 is constituted by a page unit. The page is a basic unit of write and read. The page is divided into a main region and a spare region. For example, memory capacity of one page is 528 Bytes. Among 528 Bytes, the main region is 512 Bytes, and the spare region is 16 Bytes.

The buffer memory 290 temporarily stores data of the flash memory 260. The buffer memory 290 is capable of performing a random access. The buffer memory may be embodied employing a SRAM or a DRAM, which is capable of performing a random access. In this case, a host interface mode is determined according to an interface mode of the RAM used as the buffer memory 290.

It is essential for the buffer memory 290 and the flash memory 260 to have the same address structure so as to efficiently operate the flash memory device 200. In other words, the buffer memory is constituted by a page unit in the same way as the flash memory 260. Each page unit should be formed to be divided into a main region and a spare region. In addition, the page capacity of the buffer memory 290 should be the same as that of the flash memory 260.

For instance, the buffer memory 290 has a memory capacity of 528 Bytes per page. Out of 528 Bytes, the main region is 512 Bytes, and the spare region is 16 Bytes. If the page of the buffer memory 290 is smaller than 528 Bytes or not an integral times as many as 528 Bytes, it cannot be efficiently used as the buffer memory of the flash memory device 200 where read and write operations are performed by 528 Byte units.

Referring to FIG. 1, the flash memory device 200 includes a register 220, a state machine 230, a buffer controller 270, an error correction and data I/O block (hereinafter inclusively referred to as "ECC & DQ block") 240, and a flash controller 250.

The register 220 receives a register control signal REG_CTRL, a register address REG_ADDR, and register data REG_DATA from the host interface 210. The register control signal controls a whole operation of the register 220. The register 220 performs various tasks with respect to each address. Also, the meaning of each address leading to the performed task is defined previously.

The register data is applied to a corresponding register address. The register data includes an address of a flash memory (hereinafter inclusively referred to as "a flash address"), an address of a buffer memory (hereinafter inclusively referred to as "a buffer address") and a command. The flash address means the address of the flash memory 260 where data will be stored. The buffer address means an address of the buffer memory 290 for temporarily storing data before data is stored in the flash memory 260 or is transmitted to the host 100. The command instructs read or write operations.

FIG. 2 is a table showing an address and a meaning of a register. For example, the register 220 has addresses from F000h to F003h. Specific data is written in the addresses. In FIG. 2, the data value stored in the F000h address is a device ID for indicating information about the flash memory device. The data value stored in the F001h address is an address of the flash memory 260 for storing data or reading the stored data. The data value stored in the F0002h address is an address of the buffer memory 290 for temporarily storing data or reading the stored data. The data value stored in the F003h address is an operation command of the flash memory 260.

FIG. 3 is a table showing data values stored in the F003 address and the operations implied by these data values. In FIG. 3, 0000h is a command for instructing a read operation of the flash memory 260. 0001h is a command for instructing a write operation of the flash memory 260. 000h is a command for instructing an erase operation of the flash memory 260. 0003h is a command for instructing a reset operation of the flash memory 260.

If 0000h is input to the F003h address of the register 220, the flash memory device 200 performs the following operations. The F003h address stores an operation command of the flash memory 260, and 000h input to F003h means a command for instructing a read operation of the flash memory 260. Accordingly, a read operation is performed with respect to data of a flash address being held in the F001h address of the register 220. Next, data read form the flash memory 260 is stored in a buffer address being held in the F002h address of the register 220.

If 0001h is input to the F003h address of the register 220, first of all, a read operation is performed with respect to data of the buffer address being held in the F002h address of the register 220. Next, data read from the buffer memory 290 is sequentially stored in the flash address being held in the F001h of the register 220.

If 0002h is input to the F003h address of the register 220, an erase operation is performed with respect to data of the flash address being held in the F001h address of the register 220. If 0003h value is input to the F001h value, a reset operation is performed with respect to data of the flash address being held in the F001h address of the register 220.

Referring to FIG. 1, the state machine 230 is operated referring to data values stored in the register 220. The state machine 230 controls the buffer controller 270, the ECC & DQ block 240, and the flash controller 250.

The buffer controller 270 receives commands from the state machine 230 and the host interface 210 to be performed. The buffer controller 270 controls the data read/write operation of the buffer memory 290.

The buffer controller 270 receives a control signal BUF_CTRL1, an address BUF_ADDR1, and data BUF_DATA1 from the host interface 210. The control signal BUF_CTRL1 controls an operation of the buffer controller 270. The address BUF_ADDR1 is the address where the data BUF_DATA1 is temporarily stored in the buffer memory 290. The address BUF_ADDR1 is directly from the host 100 input through the host interface 210.

In another approach, the buffer controller 270 receives a control signal BUF_CTRL2 and an address BUF_ADDR2 from the state machine 230. The control signal BUF_CTRL2 controls the buffer controller 270. The address BUF_ADDR2 is a buffer address, which is allocated internally in the flash memory device 200. In addition, the buffer controller 270 receives a command flag CMD_FLAG from the state machine 230. For example, the command flag signal is a command signal for reading data from the buffer memory 290.

The buffer controller 270 performs a function to transfer a control signal, an address, and data sent from the host 100 to the buffer memory 290. Additionally, the buffer controller 270 performs a function to selectively transfer a control signal and an address, which are applied from state machine 230 to the buffer memory 290. The buffer controller 270 receives the addresses BUF_ADDR1 and BUF_ADDR2 respectively applied from the host 100 and the state machine 230 and then selectively transfers to a decoder 280 located at the output of the buffer controller.

While a write operation is performed by reading data from the flash memory 260 depending on a control of the state machine 230, the buffer controller 270 performs a function of switching to perform both operations in case the buffer memory read command is received from the host 100.

Continuously, referring to FIG. 1, the flash memory device 200 further includes the decoder 280 located in front of the buffer memory. The decoder 280 performs a function to change the address BUF_ADDR1 applied to the host 100 into a buffer address allocated internally. In general, a buffer address applied to the host 100 is not identical to a buffer address allocated internal to the flash memory device 200.

FIG. 4 is a table showing that an address allocated in the host maps to an address allocated in memory.

(a) in FIG. 4 shows buffer addresses allocated in the host. Referring to (a) in FIG. 4, 000h through 05FFh are represented by a main data region of the buffer memory 290. 8000h through 802Fh are represented by a spare data region. And, except for the main and spare data regions, the remaining is classified into regions 0600h~7FFF and 8050h~EFFFh preserved as needed, and a register region F000h~F003h. The address BUF_ADDR1 applied by the host 100 is a 16 bit address.

(b) in FIG. 4 shows a buffer address allocated internally to be suitable to the buffer memory. Referring to (b) in FIG. 4, 000h through 5FFFh are represented by the main data region of the buffer memory 290. 600h through 62Fh are represented by the spare data region. The 16 bit address allocated from the host 100 maps to the 12 bit address allocated internally in the flash memory device 200.

The decoder 280 performs the function of mapping the 16 bit address to the 12 bit address. As shown in (b) of FIG. 4, the decoder 280 maps by separating the main data region and the spare data region. However, it is also capable of mapping without separating the main data region and the spare data region.

Meanwhile, the address BUF_ADDR2 applied by the state machine 230 is a 12 bit address allocated internally to be suitable for the buffer memory 290. Since the 12 bit address is allocated internally, it is not mapped in the decoder 280.

Continuously referring to FIG. 1, the flash controller 250 receives a control signal F-CTRL from the state machine to generate a control signal CTRL for controlling a data read or write operation of the flash memory 260.

The ECC & DQ block 240 receives control signals ECC_CTRL, DQ_CTRL, and an address F_ADDR from the state machine 230. The control signals ECC_CTRL and DQ_CTRL control an operation of the ECC & DQ block 240. The address F_ADDR is the address of the flash memory 260 for storing data. The address F_ADDR is transferred through the ECC & DQ block 240 to the flash memory 260.

The ECC & DQ block 240 transfers data input from the buffer controller 270 to the flash memory 260. In addition, the ECC & DQ block 240 transfers data input from the flash memory 260 to the buffer controller 270. The ECC & DQ block 240 corrects an error of data transmitted between the buffer controller 270 and the flash memory 260.

Elements constituted with the flash memory device 200 may be formed on one chip. In addition, it will be understood to those skilled in the art that the flash memory device 200 may be embodied employing multi-chip techniques.

Now, an operation of the flash memory device according to the present invention will be more fully described referring to FIG. 1.

The host 100 transmits a control signal, an address, and data to the flash memory device 200 through a bus. The host interface 210 changes the control signal, the address, and data into an internal signal and then transmits them to the register 220 or the buffer controller 270.

The register 220 receives a register control signal REG_CTRL, a register address REG-ADDR, and register data REG_DATA from the host interface 210. A flash address, a buffer address, and a command among the register data REG_DATA are stored in the register address REG_ADDR.

The state machine 230 controls the ECC & DQ block 240, the flash controller 250, and the buffer controller 270 according to values stored in the register 220.

The buffer controller 270 receives the control signal BUF_CTRL1, the address BUF_ADDR1, and data BUF_DATA1 from the host interface 210. The address BUF_ADDR1 is a buffer address allocated by the host 100. In addition, the address BUF_ADDR1 is an address of the buffer memory 290 for temporarily storing data before data is stored in the flash memory. The data BUF_DATA1 is stored in the address BUF_ADDR1.

In another approach, the buffer controller 270 receives the control signal BUF_CTRL2 and the address BUF_ADDR2 from the state machine 230. The address BUF_ADDR2 is a buffer address allocated internally.

The buffer controller 270 receives the addresses BUF_ADDR1 and BUF_ADDR2 to selectively transfer to the buffer memory 290. If the address BUF_ADDR1 is selected in the buffer controller 270, the address BUF_ADDR1 becomes mapped to an address allocated internally. The mapping operation is performed by the decoder 280. A mapped address is applied to the buffer memory 290.

Meanwhile, the register control signal REG_CTRL, the register address REG-ADDR, and register data REG_DATA may be applied to the register 220 before the control signal BUF_CTRL1, the address BUF_ADDR1, and data BUF-DATA1 are applied to the buffer controller 270.

The state machine 230 controls the buffer controller 270, the ECC & DQ block 240 and the flash controller 250 so that data stored in the buffer memory 290, according to values stored in the register 220, becomes read and the read data becomes stored in the flash memory 260.

For example, the state machine 230 outputs a command flag signal CMD_FLAG, a control signal BUF_CTRL2, and an address BUF_ADDR2. If a read operation is performed by the command flag signal CMD_FLAG, the buffer controller 270 controls data to be read in a buffer memory region corresponding to the address BUF_ADDR2. The read data is transmitted to the ECC & DQ block 240.

Next, the state machine 230 generates an address F_ADDR referring to a flash address value stored in the register 220. The ECC & DQ block 240 receives a control signal ECC_CTRL and the address F_ADDR from the state machine 230. The ECC & DQ block 240 corrects an error of data transmitted between the flash memory 260 and the buffer memory 290. In addition, the ECC & DQ block 240 outputs a command, an address, and data according to a predetermined timing.

The flash controller 250 converts a control signal F_CTRL from the state machine 230 into a control signal CTRL suitable for the flash memory 260 and then outputs it. Then, a data read or write operation of the flash memory is performed in a known manner.

The flash memory 260 consists of pages being a basic unit of read and write operations. The page is divided into a main region and a spare region. The flash memory 260 does not support a random access operation. To support the random access, there is a need to have the buffer memory 290. The buffer memory 290 is capable of performing the random access.

The buffer memory 290 has the same address structure as the flash memory 260. That is, the buffer memory 290 consists of pages. The page is divided into a main region and a spare region. A page capacity of the buffer memory 290 is the same as that of the flash memory 260.

In another approach, a buffer address allocated in the host 100 may not be identical to a buffer address allocated internally. In this case, a mapping operation, which changes the buffer address allocated in the host 100 into the buffer address allocated internally, is performed. The mapping operation is performed in the decoder 280.

As shown in FIG. 4, the buffer address allocated in the host 100 is divided into a main region and a spare region in the mapping operation. As a result, it is possible to perform a burst read operation by only spare data. Furthermore, there is an advantage to control an address more easily.

According to the present invention, it is possible to control an operation of the flash memory device by controlling the address structure of the buffer memory and memory capacity to be suitable to the characteristics of the flash memory.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A flash memory device comprising:
   a flash memory including a first plurality of pages, each page being divided into a first main region and a first spare region;
   a buffer memory for temporarily storing data to be written in the flash memory or data to be read from the flash memory, the buffer memory including a second plurality of pages being divided into a second main region and a second spare region;
   a register configured to store an address of the flash memory, an address of the buffer memory, and an operation command of the flash memory and the buffer memory; and
   a control circuit including a buffer controller configured to control read or write operations of the buffer memory, and a decoder to map an address applied from the buffer controller, wherein the decoder separates an address input to the buffer memory into the second main region and the second spare region, the control circuit configured to (a) convert a control signal, an address and data from a host into an internal signal for operating the flash memory device, (b) map an address from the host to a mapped address of the buffer memory, in response to the internal signal, the addresses stored in the register, and the operation command stored in the register, and (c) control data stored in the mapped address of the buffer memory to be stored in the flash memory or control control the data of the flash memory to be stored in the mapped address of the buffer memory,
wherein the first main region and the second main region have a first capacity and the first spare region and the second spare region have a second capacity, the first capacity being greater than the second capacity, and each page in the flash memory and in the buffer memory having equal capacity.

2. The flash memory device of claim 1, wherein the flash memory, the buffer memory and the control circuit are structured on one chip.

3. The flash memory device of claim 1, wherein the buffer memory is a random access memory.

4. The flash memory device of claim 3, wherein the random access memory is a SRAM.

5. The flash memory device of claim 3, wherein the random access memory is a DRAM.

6. The flash memory device of claim 1, wherein the control circuit comprises:
a flash controller configured to control read or write operations of the flash memory; and
a state machine configured to control the buffer controller and the flash controller so as to store data of the buffer memory in the flash memory or store data of the flash memory in the buffer memory according to values stored in the register.

7. The flash memory device of claim 6, wherein the control circuit further includes an error correction and data input/output circuit, and wherein the error correction and data input/output circuit is controlled by the state machine and corrects an error of data transmitted between the buffer memory and the flash memory.

8. The flash memory device of claim 1, wherein a first address structure includes the first plurality of pages and a second address structure includes the second plurality of pages.

9. The flash memory device of claim 1, wherein the address from the host includes a greater number of bits than the mapped address of the buffer memory.

10. The flash memory device of claim 1, wherein the buffer memory is outside of the flash memory.

11. A flash memory system comprising:
a host; and
a flash memory device configured to store data or output stored data according to a request of the host, wherein the flash memory device includes a flash memory including a first plurality of pages, each page being divided into a first main region and a first spare region, a buffer memory for temporarily storing data to be written in the flash memory or data to be read from the flash memory, the buffer memory including a second plurality of pages being divided into a second main region and a second spare region, and a control circuit configured to map an address of the flash memory applied from the host to be suitable to the buffer memory and controlling the flash memory and the buffer memory to store data of the buffer memory in the flash memory or to store data of the flash memory in the buffer memory, the control circuit including a buffer controller configured to control read or write operations of the buffer memory, and a decoder to map an address applied from the buffer controller, wherein the decoder separates an address input to the buffer memory into the second main region and the second spare region; and
a register configured to store an address of the flash memory, an address of the buffer memory, and an operation command of the flash memory and the buffer memory,
wherein the control circuit is further configured to (a) convert a control signal, an address and data from the host into an internal signal for operating the flash memory device, (b) map an address from the host to a mapped address of the buffer memory, in response to the internal signal, the addresses stored in the register, and the operation command stored in the register, and (c) control data stored in the mapped address of the buffer memory to be stored in the flash memory or control the data of the flash memory to be stored in the mapped address of the buffer memory,
wherein the first main region and the second main region have a first capacity and the first spare region and the second spare region have a second capacity, the first capacity being greater than the second capacity, and each page in the flash memory and in the buffer memory having equal capacity.

12. The flash memory system of claim 11, wherein the flash memory, the buffer memory, and the control circuit are structured on one chip, respectively.

13. The flash memory system of claim 11, further including a host interface configured to change the control signal, the address, and the data, which are applied from the host into the internal signal to operate the flash memory device.

14. The flash memory system of claim 11, wherein the buffer memory is a random access memory.

15. The flash memory system of claim 14, wherein the random access memory is a SRAM.

16. The flash memory system of claim 14, wherein the random access memory is a DRAM.

17. The flash memory system of claim 11, wherein the control circuit comprises:
a register configured to store an address of the flash memory, an address of the buffer memory, and a command;
a flash controller to control read or write operations of the flash memory; and
a state machine configured to control the buffer controller and the flash controller so as to respectively store data of the buffer memory in the flash memory or store data of the flash memory in the buffer memory according to values stored in the register.

18. The flash memory system of claim 17, wherein the control circuit further includes an error correction and data input/output circuit, and wherein the error correction and data input/output circuit is controlled by the state machine and corrects an error of data transmitted between the buffer memory and the flash memory.

* * * * *